United States Patent
Wu (10) Patent No.: US 11,330,068 B2
(45) Date of Patent: May 10, 2022

(54) METHODS AND SYSTEMS FOR RECORDING USER OPERATIONS ON A CLOUD MANAGEMENT PLATFORM

(71) Applicant: Alibaba Group Holding Limited, Grand Cayman (KY)

(72) Inventor: Junyin Wu, Sammamish, WA (US)

(73) Assignee: Alibaba Group Holding Limited, George Town (KY)

(*) Notice: Subject to any disclaimer, the term of this patent is extended or adjusted under 35 U.S.C. 154(b) by 0 days.

(21) Appl. No.: 16/938,785

(22) Filed: Jul. 24, 2020

(65) Prior Publication Data
US 2022/0030079 A1    Jan. 27, 2022

(51) Int. Cl.
| | | |
|---|---|---|
| *H04L 67/50* | (2022.01) | |
| *G06F 16/25* | (2019.01) | |
| *G06F 16/22* | (2019.01) | |
| *H04L 67/10* | (2022.01) | |
| *G06F 8/41* | (2018.01) | |
| *G06F 9/54* | (2006.01) | |
| *G06F 16/28* | (2019.01) | |

(52) U.S. Cl.
CPC ............... *H04L 67/22* (2013.01); *G06F 8/41* (2013.01); *G06F 9/543* (2013.01); *G06F 9/548* (2013.01); *G06F 16/22* (2019.01); *G06F 16/258* (2019.01); *G06F 16/284* (2019.01); *H04L 67/10* (2013.01)

(58) Field of Classification Search
CPC ......... H04L 67/22; H04L 67/10; G06F 16/22; G06F 16/282; G06F 16/258; G06F 8/41; G06F 9/543; G06F 9/548

USPC ........................................................ 715/704
See application file for complete search history.

(56) References Cited

U.S. PATENT DOCUMENTS

| | | | |
|---|---|---|---|
| 8,709,841 B2 * | 4/2014 | Nakata ................. | D03D 15/47 257/431 |
| 8,839,260 B2 | 9/2014 | Doyle et al. | |
| 9,716,634 B2 | 7/2017 | Sapuram et al. | |
| 9,800,470 B2 | 10/2017 | Agarwal et al. | |
| 9,843,617 B2 | 12/2017 | Maturana et al. | |
| 10,122,829 B2 | 11/2018 | Saavedra | |
| 10,404,551 B2 | 9/2019 | Thomas et al. | |
| 10,447,538 B2 | 10/2019 | Maes | |
| 2012/0221696 A1 * | 8/2012 | Ferris ..................... | H04L 67/10 709/223 |
| 2012/0226796 A1 * | 9/2012 | Morgan .................. | H04L 67/10 709/224 |

(Continued)

*Primary Examiner* — William D Titcomb
(74) *Attorney, Agent, or Firm* — Lee & Hayes, P.C.

(57) ABSTRACT

Methods and systems for recording user operations on a cloud management platform are provided. According to one aspect, a method comprises recording one or more user operations on a cloud management platform, the one or more user operations being associated performing a task; storing data associated with the one or more user operations in a database; and executing the data associated with the one or more user operations, allowing replay of the one or more user operations on the cloud management platform to repeat the task. The one or more user operations on the computing platform correspond to one or more application programming interface (API) operations and executing the one or more user operations on the cloud management platform, causing the computing device to call the one or more API operations to complete the task on the cloud management platform.

18 Claims, 7 Drawing Sheets

(56) References Cited

U.S. PATENT DOCUMENTS

| | | | |
|---|---|---|---|
| 2014/0351421 A1* | 11/2014 | Madani | G06Q 10/04 |
| | | | 709/224 |
| 2015/0032881 A1* | 1/2015 | Madani | H04L 43/0817 |
| | | | 709/224 |
| 2015/0067604 A1* | 3/2015 | Naseh | H04L 41/0803 |
| | | | 715/828 |
| 2015/0067698 A1* | 3/2015 | Naseh | G06F 9/4843 |
| | | | 718/106 |
| 2015/0222723 A1 | 8/2015 | Adapalli et al. | |
| 2016/0094477 A1 | 3/2016 | Bai et al. | |
| 2016/0285694 A1 | 9/2016 | Maes | |
| 2017/0046235 A1* | 2/2017 | Straub | G06F 8/35 |
| 2017/0048339 A1* | 2/2017 | Straub | G06F 16/2379 |
| 2017/0171340 A1* | 6/2017 | Kurita | H04L 67/2819 |
| 2018/0276057 A1* | 9/2018 | Chen | H04L 67/02 |
| 2019/0082004 A1* | 3/2019 | Bosch | G06F 8/60 |

* cited by examiner

METHODS AND SYSTEMS FOR RECORDING USER OPERATIONS ON A CLOUD MANAGEMENT PLATFORM

BACKGROUND

Cloud management platform is a suite of integrated software tools that an enterprise can use to monitor and control cloud computing resources. While an organization can use a cloud management platform exclusively for a private or public cloud management, these toolsets commonly target hybrid and multi-cloud models to help centralize control of various cloud-based infrastructures. Capabilities of the cloud manage platform include providing general services, service management, resource management, financial management, governance and security services, etc.

In resource management, the cloud management platform provides various tools to manage cloud computing resources, such as virtual machines, storage and networks, with capabilities such as resource discovery, tagging, provisioning, automation and orchestration. In addition, the cloud management platform might include capabilities to migrate resources between environments, such as private and public clouds. The cloud management user interfaces provided by the vendors are based on web browser. A user or an administrator of the cloud management platform may have to frequently perform a same task related to resource management, for example, creating an object storage service (OSS) bucket. The user or the administrator has to repeat the same operations on the web-based user interface to call the APIs in the backend to complete the task. Such frequent repetition of the operations is time-consuming and may cause errors due to user manual inputs. It is desirable to provide a method and a system that can improve the efficiencies of performing the tasks on the cloud management platform.

BRIEF DESCRIPTION OF THE DRAWINGS

Methods and systems for recording user operations on a cloud management platform are provided. According to an aspect of the present disclosure, a method for recording user operations on a cloud management platform comprises recording one or more user operations on a cloud management platform, the one or more user operations being associated with a task; storing data corresponding to the recorded one or more user operations in a database; and executing the data corresponding to the recorded one or more user operations to replay the one or more user operations on the cloud management platform to perform the task. The one or more user operations on the cloud management platform associated with a task may respectively correspond to one or more APIs operations and/or any combination of the one or more APIs operations in the backend to complete the task. When recording the one or more user operations on the cloud management platform, the one or more APIs operations and/or any combination of the one or more APIs operations in the backend to complete the task are simultaneously recorded. The recorded user operations on the cloud management platform (i.e., corresponding to the one or more APIs operations and/or any combination of the one or more APIs operations in the backend) may be stored in the backend of the cloud management platform. For example, the recorded user operations on the cloud management platform may be stored in a local database attached to the cloud management platform, a relational database, a NoSQL database, etc.

According to another aspect of the present disclosure, the recorded user operations on the cloud management platform (i.e., corresponding to the one or more APIs operations and/or any combination of the one or more APIs operations in the backend) may be replayed on the cloud management platform, thus, allowing automation of performing the task.

According to yet another aspect of the present disclosure, the recorded user operations on the cloud management platform (i.e., corresponding to the one or more APIs operations and/or any combination of the one or more APIs operations in the backend) may be exported to any computer and human readable format such that data related to the recorded user operations can be edited, compiled, and/or executed in another compiling environment. By way of example, but without limitation, the recorded user operations on the cloud management platform may be exported as Java language, Python language, source code, Shell script, Batch script, Powershell script, YAML file, JSON file, etc. In implementations, the recorded user operations on the cloud management platform may be exported as at least one orchestration template executable on an object orientated system (OOS) for operation and management. In implementations, the computer and human readable format described above may be compatible with the system of the cloud service provider.

The routine maintenance of the cloud services and/or the cloud products involves a large number of repetitive operations on the cloud management platform. By recording user operations on the cloud management platform, the present disclosure facilitates automation of various tasks performed on a cloud management platform, such as, creating and maintaining the cloud services and/or the cloud products. Therefore, the present disclosure greatly improves the efficiencies of the cloud products management and eliminated the errors due to manual repetition of these operations.

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

The application describes multiple and varied implementations and implementations. The following section describes an example framework that is suitable for practicing various implementations. Next, the application describes example systems, devices, and processes for implementing a distributed training system.

Figure 1:
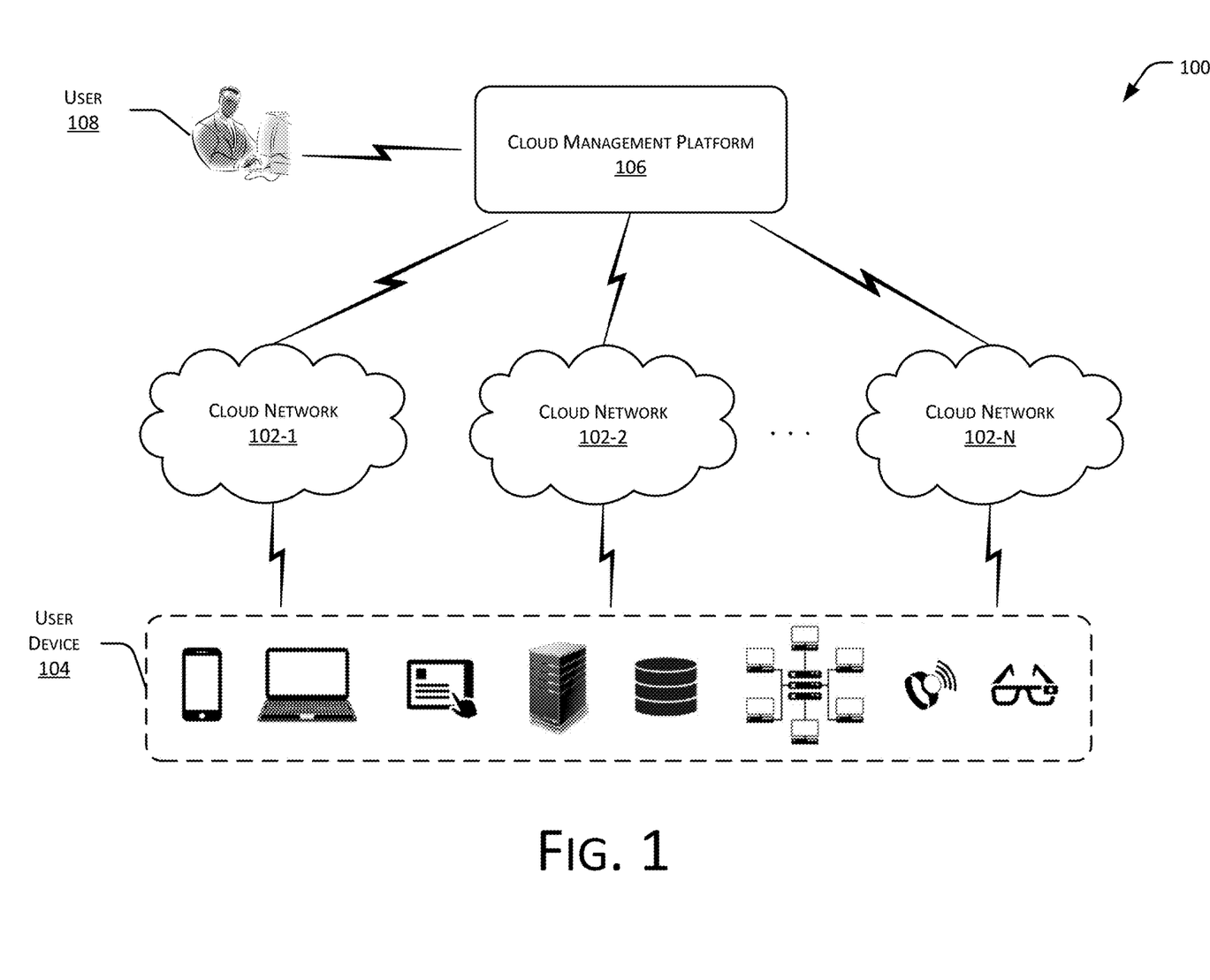
FIG. 1 illustrates an example cloud computing environment in which a cloud management platform may be associated with in accordance with an implementation of the present disclosure.

FIG. 1 illustrates an example cloud computing environment in which a cloud management platform may be associated with in accordance with an implementation of the present disclosure. The cloud computing environment 100 may include a plurality of cloud networks 102-1, 102-2, . . . , 102-N (which are collectively called hereinafter as cloud network 102), where N is a positive integer greater than one. In implementations, the cloud network 102 may denote an infrastructure with network capabilities and network resources available on demand through a third-party service provider, also referred to as a cloud provider, that hosts them on a cloud management platform 106. The infrastructure of the cloud network 102 may include, but not limited to, computing devices, storage devices, networking devices, and software and applications implemented on these devices enabling the network capabilities of the cloud network 102. The network resources may include, but not limited to, virtual switches, virtual routers, virtual storage and database, virtual firewalls, and bandwidth and network management software, with other tools and functions available on demand. In implementations, the cloud network 102 may be a centralized network having the computing devices, the storage devices, and the networking devices connected together in one location. In other implementations, the cloud network 102 may have functions distributed over multiple locations from a center location hosting central computing devices, also referred to as central computing servers. The computing servers of the cloud network 102 located in a location close to end users may be referred to as edge servers.

The cloud network 102 may include a public cloud network, a private cloud network, a hybrid cloud network, or the combination thereof. The public cloud network may refer to as the computing services offered by third-party providers over the public Internet. The public cloud may host a variety of computing services (also referred to as the cloud services or cloud products) that are available to anyone to use or purchase. The providers of the public cloud allows the consumers to pay only per usage for the CPU cycles, storage space, or bandwidth. As these cloud services or cloud products are virtually hosted on the public cloud, creating, deleting, and maintaining these cloud services or cloud products can be performed on the cloud management platform 106. The private cloud network may refer to as a cloud environment dedicated to a consumer. The infrastructure and purchased services and products are maintained by the internal IT of the consumer. The private cloud network may run on-premise. Alternatively, or additionally, the private cloud network may be constructed on rented, vendor-owned data centers located off-premise. The hybrid cloud network may refer to a mixed computing, storage, and services environment made up of on-premises infrastructure, private cloud services, and a public cloud network.

The cloud computing environment 100 may further include a variety of user devices 104 that are connected to the cloud network 102. The variety of user devices 104 may include multiple types of devices operated by the users of the cloud services provided by the cloud network 102. For example, but without limitation, the variety of user devices 104 may include smart phones, laptops, tablets, desktops, storage devices, enterprise intranets, etc. In some examples, the variety of client devices 104 may further include wearable devices, such as smart watches, smart glasses, electronic textiles, etc.

In implementations, the cloud computing environment 110 may further include a cloud management platform 106 configured to provide a user-interactive interface that enables the management of various cloud products and different cloud environments (i.e., public cloud environment, private cloud environment, and hybrid cloud environment). The cloud services and/or products provided through the cloud management platform 106 may include, but not limited to, software as a service (SaaS), platform as a service (PaaS), and infrastructure as a service (IaaS). Saas may utilize the internet to deliver applications to the users. The Saas applications may be managed by a third-party provider via the internet. A majority of the SaaS applications may run through the web browser and the users do not require any downloads or installations on the client side devices. Paas may deliver a framework to developers, upon which, the developers can build customized applications. All servers, storage, and networking may be managed by the enterprise or a third-party provider while the developers may maintain management of the applications. Iaas is fully self-service for accessing and monitoring computers, networking, storage, and other services. IaaS may deliver cloud computing infrastructure, including servers, network, operating systems, and storage, through virtualization technology. These cloud servers may be provided to the organization through a dashboard or an API, giving IaaS users complete control over the entire infrastructure. IaaS may provide the same technologies and capabilities as a traditional data center without having to physically maintain or manage all of it. IaaS users can still access their servers and storage, however, the servers and storage are all outsourced through a "virtual data center" in the cloud.

The cloud management platform 106 may be accessible from the side of the cloud service provider and/or the side of the cloud service consumer. A user 108 may operate the user-interactive interface to perform tasks related to the cloud services or the cloud products on the cloud management platform. The user 108 may include an administrator of the cloud management platform 106 at the cloud service provider side and/or a user of the cloud service at the cloud service consumer side. In implementations, the users of the cloud service may send a request to purchase a cloud product, modify a cloud product, or delete a cloud product via the user device 104. In other implementations, the users of the cloud service may directly operate the user-interactive interface of the cloud management platform to perform the tasks. By way of example, but no limitation, the user 108 may operate the user-interactive interface to create virtual servers (also referred to as cloud servers), virtual storage spaces (also referred to as cloud storage spaces), virtual private cloud for an enterprise or an organization, etc. The operation on the user-interactive interface may include compiling computer and human readable language such as, Java, Python, Shell scripts, PowerShell scripts, Batch scripts, orchestrating YAML/JSON files, or the combination thereof.

The operations of the user 108 on the cloud management platform 106 may cause the CPU to call corresponding application programming interfaces (APIs) in the backend of the computing environment to complete a specific task. By way of example, but no limitation, creating an elastic computer service (ECS) instance on the cloud management platform 106 based on inputs of the user 108 may cause the CPU to call the groups of APIs that respectively define one or more of the regional information with available ECS services, billing types of the ECS instance, imaging activities of the ECS instance, security group information, virtual switch information, description of the ECS instance, maximum output bandwidth of the ECS instance, numbers of the ECS instances to be created, disk information, security enhancement strategy, etc.

In implementations, each API group may further include a plurality of APIs related to different activities. For example, but without limitation, the API related to disk information may further include one or more of an API to create a disk and select a type of the disk (i.e., CreateDisk), an API to delete and release a disk (i.e., DeleteDisk), an API to inquiry information of a created disk (i.e., DescribeDisks), an API to attach an a disk to an existing disk (i.e., AttachDisk), an API to detach a disk from an existing disk (i.e., DetachDisk), an API to modify the attributes of a created disk (i.e., ModifyDiskAttribute), an API to replace a system disk of an ECS instance (i.e., ReplaceSystemDisk), an API to re-initiate a disk to an initial state (i.e., RelnitDisk), an API to reset a disk to roll back to a pre-set state using snapshot of the disk (i.e., ResetDisk), an API to resize the disk (i.e., ResizeDisk), an API to modify the charge type of a disk of an ECS instance (i.e., ModifyDiskChargeType), an API to upgrade the performance of a disk (i.e., ModifyDiskSpec), etc.

It should be appreciated that the APIs and the groups of APIs described above are merely for illustration purpose. Different cloud products may be created by calling a combination of APIs from different API groups. Further, the cloud computing environment 100 in FIG. 1 is merely for illustration purpose. The cloud computing environment 100 may include other cloud networks, computing devices and/or storage devices. The present disclosure is not intended to be limiting.

Figure 2:
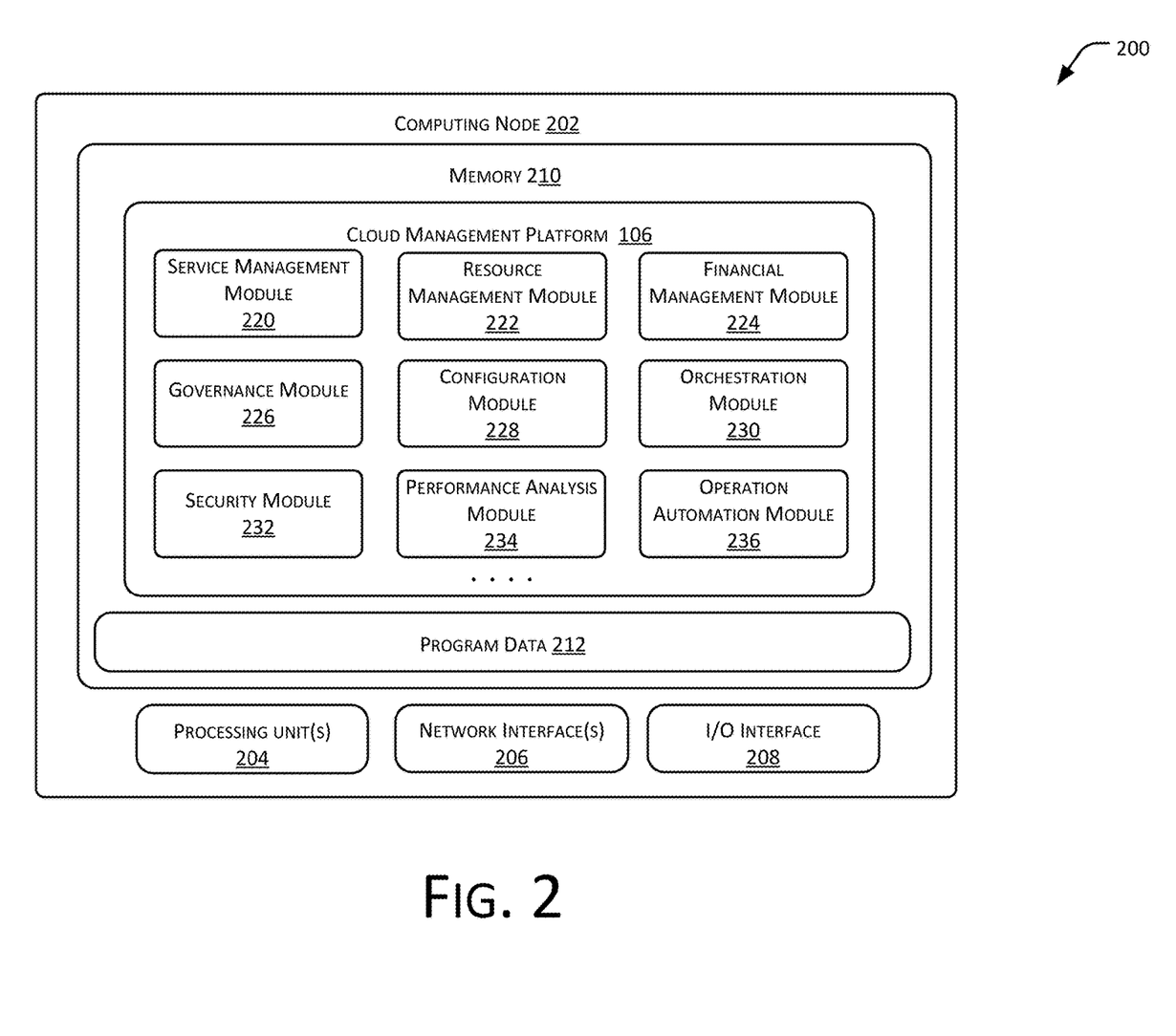
FIG. 2 illustrates an example configuration of a computing node for implementing the cloud management platform in accordance with an implementation of the present disclosure.

FIG. 2 illustrates an example configuration of a computing node for implementing the cloud management platform in accordance with an implementation of the present disclosure. The example configuration 200 of the computing node for implementing the cloud management platform may include, but is not limited to, one or more processing units 204, one or more network interfaces 206, an input/output (I/O) interface 208, and a memory 210.

In implementations, the processing units 204 may be configured to execute instructions that are stored in the memory 210, received from the input/output interface 208, and/or the network interface 206. In implementations, the processing units 204 may be implemented as one or more hardware processors including, for example, a microprocessor, an application-specific instruction-set processor, a physics processing unit (PPU), a central processing unit (CPU), a graphics processing unit, a digital signal processor, a tensor processing unit, etc. Additionally, or alternatively, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc.

The memory 210 may include machine readable media in a form of volatile memory, such as Random Access Memory (RAM) and/or non-volatile memory, such as read only memory (ROM) or flash RAM. The memory 210 is an example of machine readable media. The machine readable media may include a volatile or non-volatile type, a removable or non-removable media, which may achieve storage of information using any method or technology. The information may include a machine readable instruction, a data structure, a program module or other data. Examples of machine readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing node. As defined herein, the machine readable media does not include any transitory media, such as modulated data signals and carrier waves.

In implementations, the network interfaces 206 may be configured to connect the computing node 202 to other computing devices via the cloud network 102. The network interfaces 206 may be established through a network interface controller (NIC), which may employ both hardware and software in connecting the computing node 202 to the cloud network 102. Each type of NIC may use a different type of fabric or connector to connect to a physical medium associated with the cloud network 102. Examples of types of fabrics or connectors may be found in the IEEE 802 specifications, and may include, for example, Ethernet (which is defined in 802.3), Token Ring (which is defined in 802.5), and wireless networking (which is defined in 802.11), an InfiniBand, etc.

In implementations, the computing node 102 for implementing the cloud management platform may further include other hardware components and/or other software components, such as program modules of a cloud management platform 106 to execute instructions stored in the memory 210 for performing various operations, and program data 212 for storing data related to the various operations. The program modules of the cloud management platform 106 may include, but not limited to, a service management module 220, a resource management module 222, a financial management module 224, a governance module 226, a configuration module 228, an orchestration module 230, a security module 232, a performance analysis module 234, and an operation automation module 236.

The service management module 220 may be configured to provide the operational aspects of the applications or services once the applications or services are delivered as products. The Applications or services may be monitored to ensure availability and performance according to the agreed level of services upon purchased. The resource management module 222 may be configured to virtually procure and release of the cloud resource. The cloud resource may include one or more resources related to cloud computing. For example, the resource management module 222 may release storage space, bandwidth, security keys, etc., assigned to an ECS instance upon receiving a request to delete the ECS instance. The financial management module 224 may be configured to manage an enterprise or an organization's financial planning on the cloud. The financial management module 224 manage account information, manage budgets based on the usage of the purchased cloud products, generate financial reports, process payroll and payment, etc. The governance module 226 is configured to define a framework with a set of policies and standard practices, for example, policies for cost optimization, resiliency, security, or compliance. These policies and standard practices may be defined with respect to different consumer infrastructure, e.g., private cloud or hybrid cloud. The configuration module 228 may be configured to provide automated configuration of the cloud services and/or products. The orchestration module 230 may be configured to manage the interconnections and interactions among workloads on public and private cloud infrastructures by use of programming technology. The orchestration module 230 may be configured to connect automated tasks into a cohesive workflow to accomplish a task with permissions oversight and policy enforcement. The security module 232 may be configured to manage data security and user access in cloud computing. The security management may be achieved by using of a Cloud Access Security Broker (CASB), which allows the user to view all cloud services in use and to apply security policy across these cloud services. The performance analysis module 234 may be configured to measure performance gauge cloud elasticity in the context of an enterprise's mission requirements. The performance analysis module 234 may measure the usage of overall cloud processing capacity over time and across all services in the mission workflow to determine the cloud processing utilization.

The operation automation module 236 may be configured to automate the installation, configuration and management process of cloud computing services using software-based solutions. In implementations, the operation automation module 236 may be further configured to record one or more user operations related to completing a task on the cloud management platform. The one or more user operations on the cloud management platform may cause CPU (i.e., the processing unit 204) to call one or more API operations in the backend to complete the task. By way of example, but without limitation, the operation automation module 236 may record one or more user operations on the cloud management platform and/or the corresponding API operations in the backend to complete the task of creating an ECS instance. The calling of multiple APIs in the backend may be triggered by a user compiling a computer program on the cloud management platform. The operation automation module 236 may further record one or more parameters related to the one or more APIs to create the ECS instance. Data related to creating the ECS instance, i.e., the one or more user operations on the cloud management platform, the one or more corresponding APIs in the backend, and/or the one or more parameters, may be saved in a storage space. In implementations, the operation automation module 236 may execute or compile the data related to creating the ECS instance, allowing the CPU (i.e., the processing unit 204) to automatically replay the calling of the corresponding one or more APIs and the associated parameters to create another ECS instance.

It should be appreciated that the program modules of the cloud management platform 106, i.e., the service management module 220, the resource management module 222, the financial management module 224, the governance module 226, the configuration module 228, the orchestration module 230, the security module 232, the performance analysis module 234, and the operation automation module 236 described above are merely for illustration purpose. The functions of these modules may be integrated to fewer program modules. Alternatively, or additionally, each program module may include one or more sub-modules to perform individual functions. The cloud management platform may further develop and deploy other program modules on-demand. The present disclosure is not intended to be liming.

Figure 3:
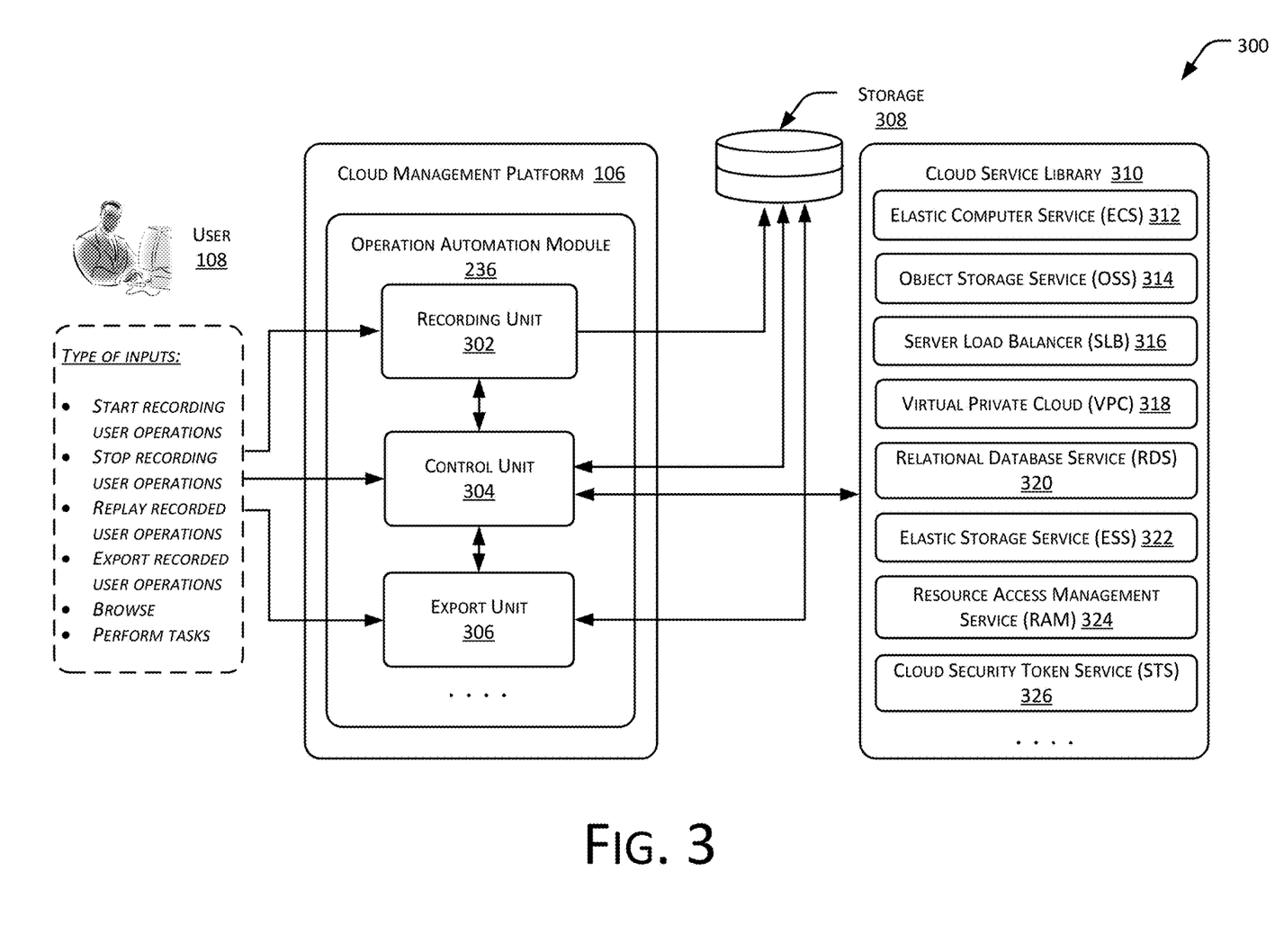
FIG. 3 illustrates an example configuration of an operation automation module for recording user operations on the cloud management platform in accordance with an implementation of the present disclosure.

FIG. 3 illustrates an example configuration of an operation automation module for recording user operations on the cloud management platform in accordance with an implementation of the present disclosure. The example configuration 300 of the operation automation module 240 shown in FIG. 2 may include a recording unit 302, a control unit 304, and an export unit 306.

The recording unit 302 may be configured to start and stop recording one or more user operations related to performing a task on the cloud management platform 106. The one or more user operations herein may refer to one or more user actions on a user interface of the cloud management platform 106 to perform a task. The one or more user operations may include, but not limited to, compiling and/or executing computer programs in an environment, clicking and/or double-clicking contents on the user interface, dragging contents on the user interface, inputting text via applications or software, voice interactions with the user interface, video interactions with the user interface, etc. In implementations, the task may include creating a cloud service or product on the cloud management platform. Alternatively, or additionally, the task may include maintaining, editing, and/or deleting a cloud service or product on the cloud management platform. For example, the computing node 202 may detect a user compiling a computer program written in Java to create a virtual private cloud (VPC) on the cloud management platform 106. The recording unit 302 records the user operations related to compiling the computer program. As the user operations on the cloud management platform 106 may cause the CPU (i.e., the processing unit 204) to call one or more APIs in the backend, the recording the user operations on the cloud management platform 106 may simultaneously record the corresponding one or more API operations in the backend. The task may include, but not limited to, creating a cloud service or product on the cloud management platform 106, modifying a cloud service or product, deleting a cloud service or product from the cloud management platform 106, monitoring performance of a cloud service or product and generating analytic reports, orchestrating workloads on the cloud infrastructures, etc. To perform these tasks on the cloud management platform 106, the CPU (i.e., the processing unit 204) may access the cloud resources in a cloud service library 310. The cloud resources (also referred to cloud services, cloud products, etc.) in the cloud service library 310 may include elastic computer service (ECS) 312, object storage service (OSS) 314, server load balancer (SLB) 316, virtual private cloud (VPC) 318, relational database service (RDS) 320, elastic storage service (ESS) 322, resource access management service (RAM) 324, cloud security token service (STS) 326, etc. It should be understood that the cloud products as shown in FIG. 3 are merely for illustration purpose. The cloud service library 310 may include other cloud service products such as, content management service (CMS), distributed denial of service (DDOS), content delivery network (CDN) service, or other services developed on-demand.

The control unit 304 may be configured to generate one or more API requests (also referred to as calling one or more APIs) to access corresponding cloud resources and configure the parameters of the corresponding cloud resources. The control unit 304 may generate the one or more API requests responsive to user inputs on the cloud management platform 240. The types of user inputs may include, but not limited to, starting recording user operations, stop recording user operations, replay recorded user operations, exporting recorded user operations, browsing content on the cloud management platform 106, performing tasks on the cloud management platform 106, etc. The format of the one or more API requests may be compatible with the cloud service library 310. In implementations, the one or more API requests may include uniform resource identifiers (URIs) to address the corresponding cloud resources in the cloud service library 310. In implementations, the task on the cloud management platform 106 may be completed by integrating the corresponding cloud resources.

In implementations, the cloud management platform 106 may receive one or more user actions to record the operations related to performing a task, for example, creating an object storage service (OSS) bucket. The control unit 304 may generate one or more API requests to access the corresponding cloud resources in the cloud service library 310 to be integrated to generate the OSS bucket. The control unit 304 may further configure the parameters associated with the OSS bucket. The control unit 304 may send a signal to the recording unit 302 to record the user operations associated with creating the OSS bucket. In implementations, the user operations associated with creating the OSS bucket may cause the CPU (i.e., the processing unit 204) to call the APIs to perform operations including, but not limited to, configuring a life cycle of the OSS bucket, configuring logging function of the OSS bucket, configuring a static website hosting of the OSS bucket, configuring a referrer list of the OSS bucket, configuring access control list (ACL) of the OSS bucket, etc. While recording the user operations on the cloud management platform 106, the recording unit 302 simultaneously records the API operations associated with creating the OSS bucket described above and saves the recorded data in a storage 308. The recorded data associated with creating the OSS bucket may be exported to a programming language, such as, Java, Python, etc., that can be further compiled in the corresponding environment to replay the user operations to create the OSS bucket. Alternatively, or additionally, the recorded data associated with creating the OSS bucket may be exported to Shell scripts, source codes or YAML/JSON files that can be edited and executed to perform other tasks. For example, but without limitation, the recorded data is related to creating one OSS bucket having 500 MB storage space. To perform another task to create one hundred OSS buckets, each having 500 MB storage space, the recorded data may be edited and executed to automate the creation of one hundred OSS buckets.

In implementations, the cloud management platform 106 may receive one or more user actions to record the operations related to creating an elastic computer service (ECS) instance. The control unit 304 may generate one or more API requests to access the corresponding cloud resources in the cloud service library 310 to be integrated to generate the ECS instance. The control unit 304 may further configure the parameters associated with the ECS instance. The control unit 304 may send a signal to the recording unit 302 to record the user operations associated with creating the ECS instance. In implementations, the user operations associated with creating the ECS instance may cause the CPU (i.e., the processing unit 204) to call the APIs to perform operations including, but not limited to, configuring regional information, configuring charge type, configuring purchased life time, configuring virtual switch, configuring maximum output bandwidth, configuring number of the ECS instances, activating a router interface, allocating dedicated hosts, allocating IP address, configuring snapshot policies, configuring IPv6 address, attaching disk to the ECS instance, attacking key pairs to the ECS instance, authorizing security group, etc. The recording unit 302 may record the user operations simultaneously with the API operations in the backend associated with creating the ECS instance described above and save the recorded data in a storage 308. The recorded data associated with creating the ECS instance may be exported to any computer and human readable format including, but not limited to, Java, Python, scripts, source codes, YAML/JSON files etc. The recorded data associated with creating the ECS instance may be further compiled in the corresponding environment to replay the operations to create the ECS instances. Alternatively, or additionally, the recorded data associated with creating the ECS instance may be further edited and executed to automate other tasks on the cloud management platform 106.

The export unit 306 may be configured to export the recorded data associated with performing a task. Upon receiving a request to export the recorded data, the control unit 304 may send a signal to the export unit 306 to export the recorded data in a format determined by the user. The recorded data may be exported into one or more formats including, but not limited to, Java, Python, scripts, source codes, YAML/JSON files, etc. In implementations, the recorded user operations on the cloud management platform may be exported as at least one orchestration template executable on an object orientated system (OOS) for operation and management. The recorded user operations on the cloud management platform may be further saved in a relational database or a NoSQL database.

It should be understood that the recorded data associated with performing a task on the cloud management platform may be saved and/or exported to any computer readable or compliable format. The examples described above are merely for illustration purpose. It should also be appreciated that the examples of tasks performed on the cloud management platform and the operations associated with the tasks described above are merely for illustration purpose. The tasks may further include maintaining/editing/deleting the ECS instance and OSS bucket, creating/editing/deleting other cloud service products, etc. The operations associated with performing the task may include calling other APIs in the backend. The present disclosure is not intended to be limiting.

The methods described in FIGS. 4-7 are described in the general context of machine-executable instructions. Generally, machine-executable instructions can include routines, programs, objects, components, data structures, procedures, modules, functions, and the like that perform particular functions or implement particular abstract data types. Furthermore, each of the example methods are illustrated as a collection of blocks in a logical flow graph representing a sequence of operations that can be implemented in hardware, software, firmware, or a combination thereof. The order in which the method is described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Figure 4:
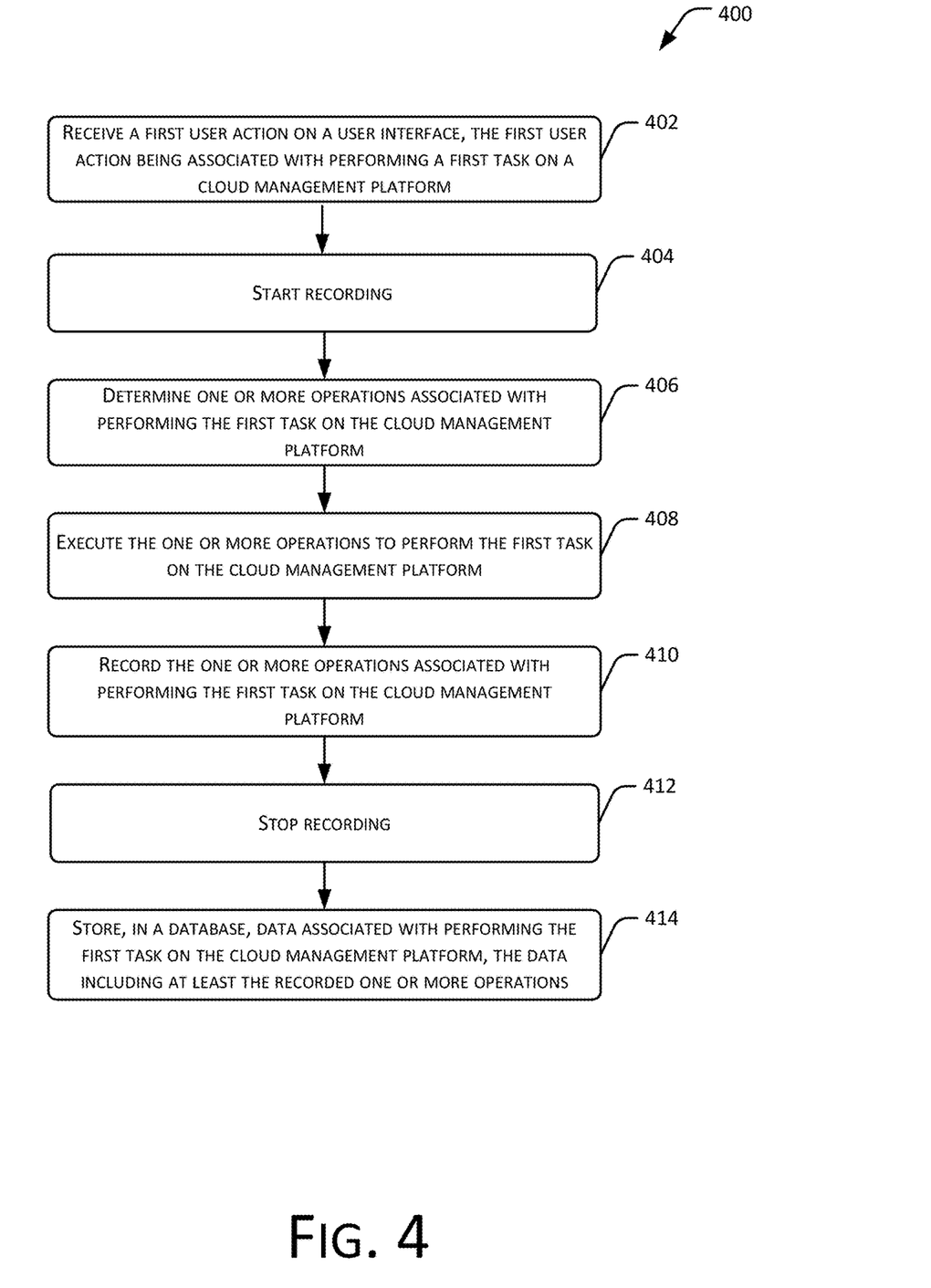
FIG. 4 illustrates an example flowchart for recording user operations on the cloud management platform in accordance with an implementation of the present disclosure.

Referring back to the method 400 described in FIG. 4, at block 402, a computing node (i.e., the computing node 202 on which, the cloud management platform 106 is implemented) may receive a first user action on a user interface, the first user action being associated with performing a first task on a cloud management platform. In implementations, the cloud management platform may refer to the cloud management platform 106 for cloud services management). The first user action on the user interface may include, but not limited to, compiling and/or executing computer programs in an environment, clicking and/or double-clicking contents on the user interface, dragging contents on the user interface, inputting text via applications or software, voice interactions with the user interface, video interactions with the user interface, etc. In implementations, the first task may include creating a cloud service or product on the cloud management platform. Alternatively, or additionally, the task may include editing and/or deleting a cloud service or product on the cloud management platform. For example, the computing node 202 may detect a user compiling a computer program written in Java to create a virtual private cloud (VPC) on the cloud management platform. In another example, the computing node 202 may receive a voice input from the user, instructing the computing node 202 to create the VPC on the cloud management platform. In yet another example, the computing node 202 may detect the user double-clicking an icon on the user interface corresponding to creating an VPC on the cloud management platform.

At block 404, the computing node (i.e., the computing node 202 on which, the cloud management platform 106 is implemented) may start recording. The recording process may be manually started by the user. Alternatively, or additionally, the recording process may be triggered by the user action on the user interface. The user action may be similar to the first user action describes above, and thus, is not described in detail herein.

At block 406, the computing node (i.e., the computing node 202 on which, the cloud management platform 106 is implemented) may determine one or more operations associated with performing the first task on the cloud management platform. In implementations, the one or more operations may be determined based at least in part on one or more user operations on the cloud management platform (i.e., the cloud management platform 106). The one or more user operations may subsequently cause the CPU (i.e., the processing unit 204) to call the corresponding APIs in the backend to perform operations related to complete the first task. In implementations, the one or more operations may be determined based at least in part on user compiling or executing a computer program on the cloud management platform. For example, executing a computer program written in JSON language may cause the CPU (i.e., the processing unit 204) to call one or more APIs such as, ActiveRouterInterface, AddBandwidthPackageIps, AddBgpNetwork, AllocateEipAddressPro, etc. to create a VPC on the cloud management platform 106.

At block 408, the computing node (i.e., the computing node 202 on which, the cloud management platform 106 is implemented) may execute the one or more operations to perform the first task on the cloud management platform. In implementations, the computing node may generate a request to call one or more APIs respectively corresponding to one or more cloud resources related to the first tasks. The computing node may further configure the parameters associated with the respective APIs.

At block 410, the computing node (i.e., the computing node 202 on which, the cloud management platform 106 is implemented) may record the one or more operations associated with performing the first task on the computing platform. In implementations, the computing may record one or more user operations on the cloud management platform. The one or more user operations may correspond to one or more API operations in the backend. The one or more user operations may cause the CPU (i.e., the processing unit 204) to call one or more APIs to access the cloud resources to complete the first task. In implementations, the one or more user operations may include user configuring the parameters related to the one or more APIs. The computing node may further record the parameters configured with respect to the one or more APIs.

At block 412, the computing node (i.e., the computing node 202 on which, the cloud management platform 106 is implemented) may stop recording once the first task is completed. In implementations, the computing node may stop recording based on the user instruction inputted via the user interface of the cloud management platform 106.

At block 414, the computing node (i.e., the computing node 202 on which, the cloud management platform 106 is implemented) may store, in a database, data associated with performing the first task on the cloud management platform, the data including at least the recorded one or more user operations on the computing platform. In implementations, the data may further include calling one or more APIs respectively corresponding to one or more cloud resources to complete the first task. The data associated with performing the first task on the computing platform may be stored in a local storage, a remote database, a cloud storage space, or any combination thereof. In implementations, the recorded user operations on the cloud management platform may be saved in a relational database or a NoSQL database.

Figure 5:
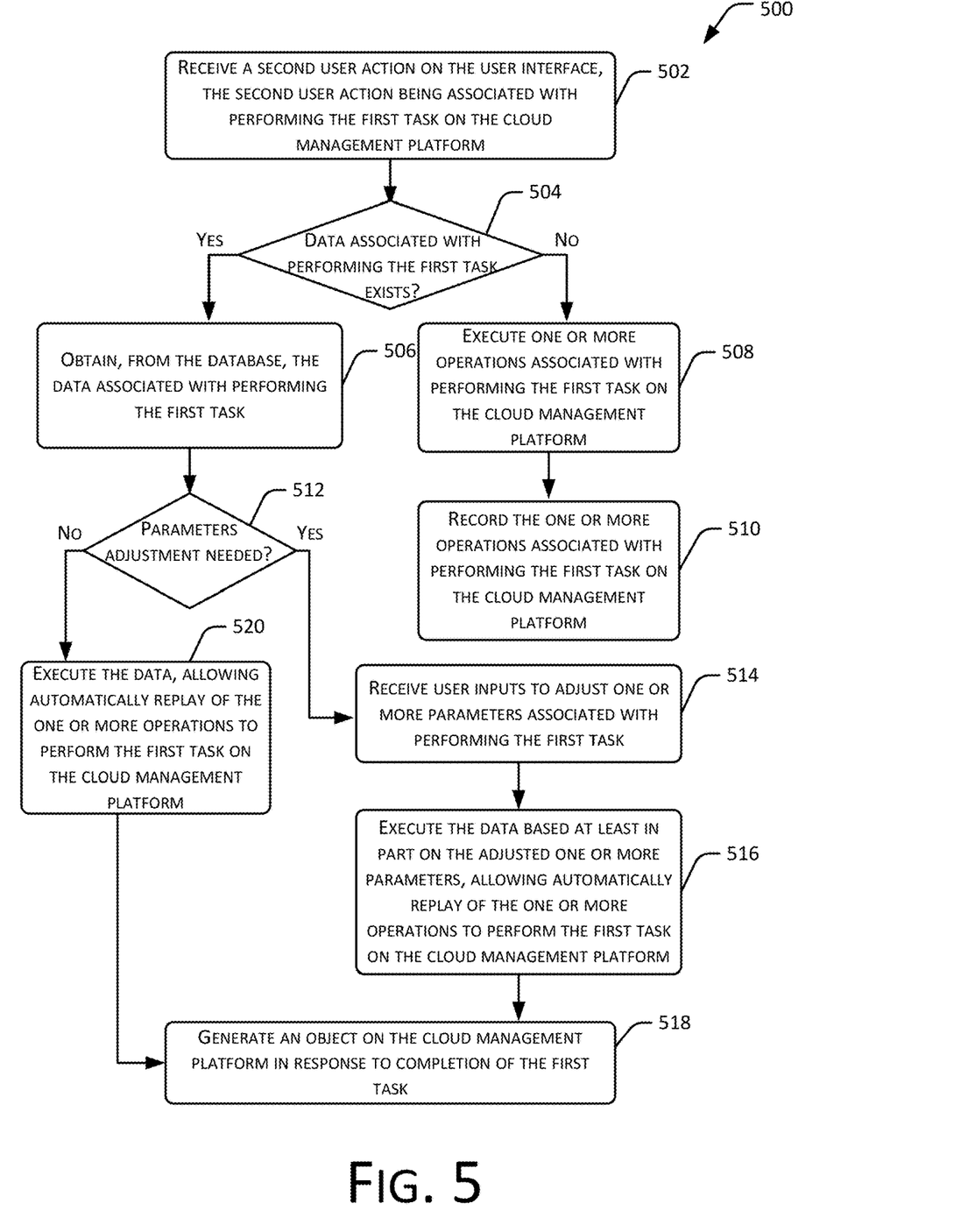
FIG. 5 illustrates another example flowchart for recording user operations on the cloud management platform in accordance with an implementation of the present disclosure.

Referring back to the method 500 described in FIG. 5, at block 502, a computing node (i.e., the computing node 202 on which, the cloud management platform 106 is implemented) may receive a second user action on a user interface, the second user action being associated with performing the first task on the cloud management platform. Similar to the first user action described at block 402, the second user action may include any user interactions with the user interface, such as, compiling computer programs in an environment, double-clicking contents on the user interface, inputting text via applications or software, voice and/or video interactions with the user interface, or any combination thereof. In implementations, the cloud management platform may refer to the cloud management platform 106 for cloud services management.

At block 504, the computing node (i.e., the computing node 202 on which, the cloud management platform 106 is implemented) may determine whether data associated with performing the first task exists.

If the data associated with performing the first task exists, at block 506, the computing node may obtain, from a database, the data associated with performing the first task. In implementations, the computing node may obtain the data from a local storage of the cloud management platform. Alternatively, or additionally, the computing node may obtain the data from a remote storage space, such as a cloud storage space.

At block 512, the computing node (i.e., the computing node 202 on which, the cloud management platform 106 is implemented) may determine whether parameters need to be adjusted. In implementations, the parameters may include the parameters associated with the one or more user operations on the computing platform to perform the first task. In implementations, the parameters may be associated with the one or more APIs respectively corresponding to the one or more user operations. For example, but without limitation, the parameters may include a disk space and/or a maximum output bandwidth for creating a virtual private cloud (VPC).

If the computing node determines that the parameters need to be adjusted, at block 514, the computing node may receive user inputs to adjust one or parameters associated with performing the first task. In implementations, the one or more parameters are associated with one or more APIs respectively corresponding to the one or more user operations on the computing platform to complete the first task.

At block 516, the computing node (i.e., the computing node 202 on which, the cloud management platform 106 is implemented) may execute the data based at least in part on the adjusted one or more parameters, allowing automatically replay of the one or more operations to perform the first task on the cloud management platform. In implementations, execution of the data may cause the CPU (i.e., the processing unit 204) to call the one or more APIs to repeat the operations to complete the first task on the cloud management platform.

At block 518, the computing node (i.e., the computing node 202 on which, the cloud management platform 106 is implemented) may generate an object on the cloud management platform in response to completion of the first task. In implementations, the object on the cloud management platform may include a cloud service or cloud product deployed on the cloud management platform. Example cloud services or cloud products are described above with respect to FIG. 3, and thus, are not detailed herein.

If the computing node determines that the parameters do not need to be adjusted, at block 520, the computing node may execute the data, allowing automatically replay of the one or more operations to perform the first task on the cloud management platform. An object may be generated on the cloud management platform upon completion of the first task at block 518.

If the data associated with performing the first task does not exist, at block 508, the computing node (i.e., the computing node 202 on which, the cloud management platform 106 is implemented) may execute one or more operations associated with performing the first task on the cloud management platform. The one or more operations may refer to the user operations on the cloud management platform, which subsequently call one or more API operations in the backend. The execution of the one or more operations are similar to block 408 of FIG. 4, and thus, is not described in detail herein.

At block 510, the computing node (i.e., the computing node 202 on which, the cloud management platform 106 is implemented) may record the one or more operations associated with performing the first task on the cloud management platform. The recording of the one or more operations are similar to block 410 of FIG. 4, and thus, is not described in detail herein.

Figure 6:
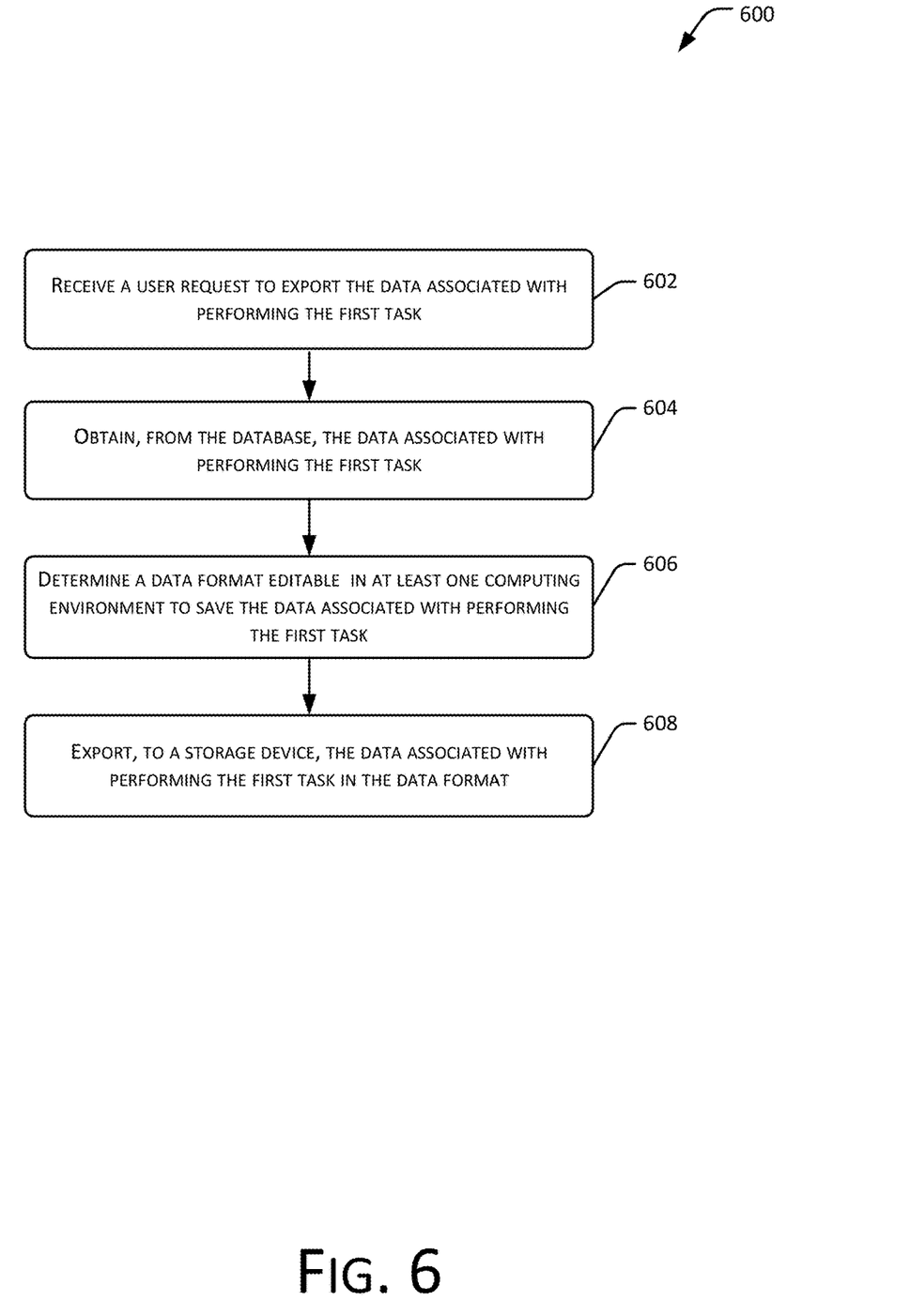
FIG. 6 illustrates yet an example flowchart for recording user operations on the cloud management platform in accordance with an implementation of the present disclosure.

Referring back to the method 600 described in FIG. 6, at block 602, the computing node (i.e., the computing node 202 on which, the cloud management platform 106 is implemented) may receive a user request to export the data associated with performing the first task. In implementations, the user request to export the data may be generated by one or more user actions on a user interface of the cloud management platform, which are similar to those described above in block 402.

At block 604, the computing node (i.e., the computing node 202 on which, the cloud management platform 106 is implemented) may obtain, from the database, the data associated with performing the first task. In implementations, the computing node may obtain the data from a local storage of the cloud management platform, a remote storage space, a cloud storage space, or the combination thereof. In implementations, the computing node may obtain the data from a relational database or a NoSQL database.

At block 606, the computing node (i.e., the computing node 202 on which, the cloud management platform 106 is implemented) may determine a data format editable in at least one computing environment to save the data associated with performing the first task. In implementations, the data format editable in at least one computing environment may include one or more computer program languages such as Java, Python, Shell scripts, PowerShell scripts, YAML, JSON, or any combination thereof. In implementations, the recorded user operations on the cloud management platform may be exported as at least one orchestration template executable on an object orientated system (OOS) for operation and management.

At block 608, the computing node (i.e., the computing node 202 on which, the cloud management platform 106 is implemented) may export, to a storage device, the data associated with performing the first task in the data format. In implementations, the data associated with performing the first task may be store in a local storage, a remote storage, a cloud storage, or any combination thereof.

Figure 7:
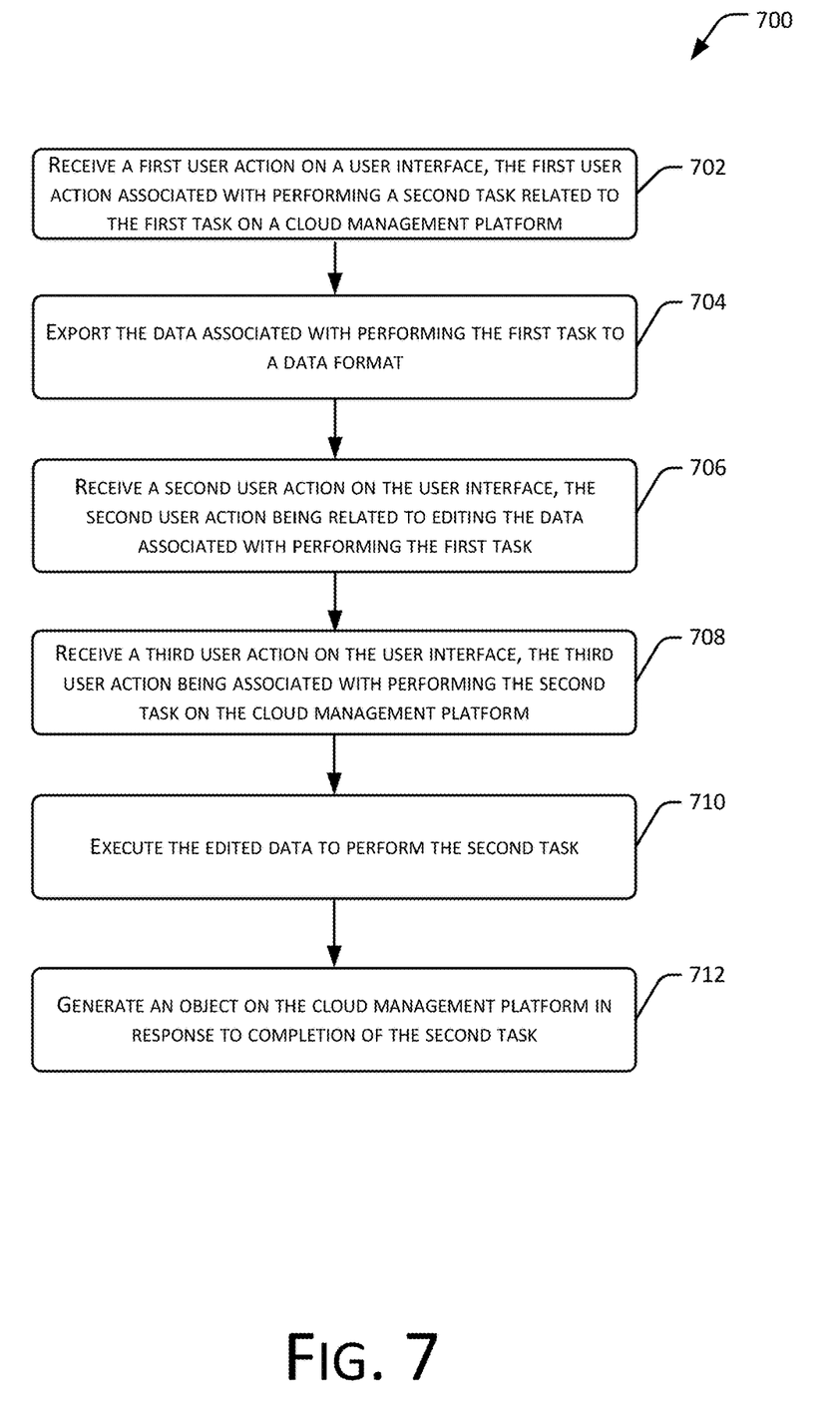
FIG. 7 illustrates yet an example flowchart for recording user operations on the cloud management platform in accordance with an implementation of the present disclosure.

Referring back to the method 700 described in FIG. 7, at block 702, the computing node (i.e., the computing node 202 on which, the cloud management platform 106 is implemented) may receive a first user action on a user interface, the first user action associated with performing a second task related to the first task on a cloud management platform. Similar to the first user action described at block 402, the second user action may include any user interactions with the user interface, such as, compiling computer programs in an environment, double-clicking contents on the user interface, inputting text via applications or software, voice and/or video interactions with the user interface, or any combination thereof. In implementations, the cloud management platform may refer to the cloud management platform 106 for cloud services management.

At block 704, the computing node (i.e., the computing node 202 on which, the cloud management platform 106 is implemented) may export the data associated with performing the first task to a data format. In implementations, the data may be exported to be saved as a data format editable in at least one computing environment may include one or more computer program languages such as Java, Python, Shell scripts, PowerShell scripts, YAML, JSON, or any combination thereof. In implementations, the recorded user operations on the cloud management platform may be exported as at least one orchestration template executable on an object orientated system (OOS) for operation and management. The exported data may include recorded one or more user operations on the computing platform to complete the first task. In implementations, the exported data may further include the calling one or more API operations in the backend to complete the first task.

At block 706, the computing node (i.e., the computing node 202 on which, the cloud management platform 106 is implemented) may receive a second user action on the user interface, the second user action being related to editing the data associated with performing the first task. In implementations, the editing of the data may include editing one or more parameters of the APIs being called during performing the first task. Given creating ECS instances as an example, the one or more parameters may include the number of instances to be created, the disk space to be attached to the ECS instance, etc. In other implementations, the editing of the data may include incorporating the data into another computer programming to perform another task. Given creating ECS instances as an example, assuming the data is exported as source code, the source code associated with creating one ECS instance may be incorporated to another source code, which when executed, automatically creates one thousand ECS instances.

At block 708, the computing node (i.e., the computing node 202 on which, the cloud management platform 106 is implemented) may receive a third user action on the user interface, the third user action being associated with performing the second task on the cloud management platform. Similar to the first user action described at block 402 and the second user action described at block 702, the third user action may include any user interactions with the user interface, such as, compiling computer programs in an environment, double-clicking contents on the user interface, inputting text via applications or software, voice and/or video interactions with the user interface, or any combination thereof.

At block 710, the computing node (i.e., the computing node 202 on which, the cloud management platform 106 is implemented) may execute the edited data to perform the second task. In implementations, the execution of the edited data may include calling the same APIs associated with performing the first task with edited one or more parameters. In other implementations, the execution of the edited data may include repeatedly calling the same APIs associated with performing the first task. In yet other implementations, the execution of the edited data may include calling one or more APIs in addition to the APIs associated with performing the first task. In yet other implementations, the execution of the edited data may include calling fewer APIs than those associated with performing the first task.

At block 712, the computing node (i.e., the computing node 202 on which, the cloud management platform 106 is implemented) may generate an object on the cloud management platform in response to completion of the second task. In implementations, the object on the cloud management platform may include a cloud service or cloud product deployed on a cloud management platform. By way of example, but without limitation, the cloud service or cloud product may include an ECS instance, an OSS bucket, an SLB instance, a VPC instance, an RDS instance, an ESS bucket, etc.

Although the above method blocks are described to be executed in a particular order, in some implementations, some or all of the method blocks can be executed in other orders, or in parallel.

In some instances, one or more components may be referred to herein as "configured to," "configurable to," "operable/operative to," "adapted/adaptable," "able to," "conformable/conformed to," etc. Those skilled in the art will recognize that such terms (i.e., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (i.e., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although implementations have been described in language specific to structural features and/or methodological acts, it is to be understood that the claims are not necessarily limited to the specific features or acts described. Rather, the specific features and acts are disclosed as exemplary forms of implementing the claimed subject matter. Additionally, or alternatively, some or all of the operations may be implemented by one or more ASICS, FPGAs, or other hardware.

EXAMPLE CLAUSES

A. A method implemented by a computing device, the method comprising: recording one or more user operations on a cloud management platform, the one or more user operations being associated with performing a task; storing data associated with the one or more user operations in a database; and executing the data associated with the one or more user operations, allowing replay of the one or more user operations on the cloud management platform to repeat the task.

B. The method as recited in paragraph A, further comprising: exporting, from the database, the data corresponding to the one or more user operations; and storing the exported data corresponding to the one or more user operations in at least one data format, wherein the at least one data format includes at least one of Java, Python, script, source code, or object oriented system (OOS) module.

C. The method as recited in paragraph B, further comprising: compiling, in an environment, the data corresponding to the one or more user operations to perform at least a second task.

D. The method as recited in paragraph A, further comprising: configuring one or more parameters associated with the data corresponding to the one or more user operations; and executing the data corresponding to the one or more user operations with the one or more parameters, allowing replay of the one or more user operations on the cloud management platform.

E. The method as recited in paragraph A, wherein the task is associated with operating at least one cloud resource provided through the cloud management platform.

F. The method as recited in paragraph E, wherein the task includes at least one of: creating at least one cloud resource on the cloud management platform; browsing at least one cloud resource on the cloud management platform; editing at least one cloud resource on the cloud management platform; or deleting at least one cloud resource on the cloud management platform.

G. The method as recited in paragraph A, further comprising: exporting, from the database, the data corresponding to the one or more user operations as at least one orchestration template executable on an object orientated system (OOS).

H. The method as recited in paragraph G, further comprising: storing data associated with the one or more user operations in at least a relational database.

I. A system comprising: one or more processors, and memory communicatively coupled to the one or more processors, the memory storing computer-executable modules executable by the one or more processors that, when executed by the one or more processors, perform actions including: recording one or more user operations on a cloud management platform, the one or more user operations being associated with performing a task; storing data associated with the one or more user operations in a database; and executing the data associated with the one or more user operations, allowing replay of the one or more user operations on the cloud management platform to repeat the task.

J. The system as described in paragraph I, wherein the actions further comprises: exporting, from the database, the data corresponding to the one or more user operations; and storing the exported data corresponding to the one or more user operations in at least one data format, wherein the at least one data format includes at least one of Java, Python, script, source code, or object oriented system (OOS) module.

K. The system as described in paragraph J, wherein the actions further comprises: compiling, in an environment, the data corresponding to the one or more user operations to perform at least a second task.

L. The system as described in paragraph I, wherein the actions further comprises: configuring one or more parameters associated with the data corresponding to the one or more user operations; and executing the data corresponding to the one or more user operations with the one or more parameters, allowing automatically replay of the one or more user operations on the cloud management platform.

M. The system as described in paragraph I, wherein the task is associated with operating at least one cloud resource provided through the cloud management platform.

N. The system as described in paragraph M, wherein the task includes at least one of: creating at least one cloud resource on the cloud management platform; browsing at least one cloud resource on the cloud management platform; editing at least one cloud resource on the cloud management platform; or deleting at least one cloud resource on the cloud management platform.

O. The system as described in paragraph I, wherein the actions further comprises: exporting, from the database, the data corresponding to the one or more user operations as at least one orchestration template executable on an object orientated system (OOS).

P. The system as described in paragraph O, wherein the actions further comprises: storing data associated with the one or more user operations in at least a relational database.

Q. A computer-readable storage medium storing computer-readable instructions executable by one or more processors of a video compression system, that when executed by the one or more processors, cause the one or more processors to perform actions comprising: recording one or more user operations on a cloud management platform, the one or more user operations being associated with performing a task; storing data associated with the one or more user operations in a database; and executing the data associated with the one or more user operations, allowing replay of the one or more user operations on the cloud management platform to repeat the task.

R. The computer-readable storage medium as described in paragraph Q, wherein the one or more user operations on the cloud management platform correspond to one or more application programming interface (API) operations, and the actions further comprises: executing the one or more user operations on the cloud management platform, causing the computing device to call the one or more API operations.

S. The computer-readable storage medium as described in paragraph Q, wherein the actions further comprises: exporting, from the database, the data corresponding to the one or more user operations; and storing the exported data corresponding to the one or more user operations in at least one data format, wherein the at least one data format includes at least one of Java, Python, script, source code, or object oriented system (OOS) module.

T. The computer-readable storage medium as described in paragraph Q, wherein the actions further comprises: compiling, in an environment, the data corresponding to the one or more user operations to perform at least a second task.

U. The computer-readable storage medium as described in paragraph Q, wherein the actions further comprises: configuring one or more parameters associated with the data corresponding to the one or more user operations; and executing the data corresponding to the one or more user operations with the one or more parameters, allowing automatically replay of the one or more user operations on the cloud management platform.

V. The computer-readable storage medium as described in paragraph Q, wherein the task is associated with operating at least one cloud resource provided through the cloud management platform.

W. The computer-readable storage medium as described in paragraph Q, wherein the task includes at least one of: creating at least one cloud resource on the cloud management platform; browsing at least one cloud resource on the cloud management platform; editing at least one cloud resource on the cloud management platform; or deleting at least one cloud resource on the cloud management platform.

X. The computer-readable storage medium as described in paragraph Q, wherein the actions further comprises: exporting, from the database, the data corresponding to the one or more user operations as at least one orchestration template executable on an object orientated system (OOS).

Y. The computer-readable storage medium as described in paragraph Q, wherein the actions further comprises: storing data associated with the one or more user operations in at least a relational database.

What is claimed is:

1. A method implemented by a computing device, the method comprising:
    receiving a first user action to trigger a recording process of one or more user operations to be performed for a task related to a process of installation and configuration of a cloud service for a first device;
    recording data associated with the one or more user operations, one or more application programming interface (API) operations called to complete the task, and one or more parameters related to the one or more API operations on a cloud management platform and corresponding to the first device;
    receiving a second user action to stop the recording process after the task is completed;
    storing the recorded data in a database;
    receiving a third user action associated with performing the task on the cloud management platform to automate the process of installation and configuration of the cloud service for a second device;
    determining whether at least one parameter of the one or more parameters needs to be adjusted for the second device;
    receiving a user input to adjust the at least one parameter if the at least one parameter needs to be adjusted; and
    executing one of the recorded data or the recorded data with the at least one adjusted parameter to automate one or more other tasks by allowing a replay of the one or more user operations on the cloud management platform to complete the process of installation and configuration of the cloud service for the second device.

2. The method of claim 1, further comprising:
exporting, from the database, data corresponding to the one or more user operations; and
storing the exported data corresponding to the one or more user operations in at least one data format,
wherein the at least one data format includes at least one of Java, Python, script, source code, or object oriented system (OOS) module.

3. The method of claim 2, further comprising:
compiling, in an environment, the data corresponding to the one or more user operations to perform at least a second task.

4. The method of claim 1, wherein the task is associated with operating at least one cloud resource provided through the cloud management platform.

5. The method of claim 4, wherein the task includes at least one of: creating, browsing, editing, or deleting at least one cloud resource on the cloud management platform.

6. The method of claim 1, further comprising:
exporting, from the database, data corresponding to the one or more user operations as at least one orchestration template executable on an object orientated system (OOS).

7. The method of claim 1, further comprising:
storing the recorded data in at least a relational database.

8. A system comprising:
one or more processors, and
memory communicatively coupled to the one or more processors, the memory storing computer-executable modules executable by the one or more processors that, when executed by the one or more processors, perform actions including:
recording data associated with one or more user operations, one or more application programming interface (API) operations, and one or more parameters related to the one or more API operations on a cloud management platform and corresponding to a first device, the one or more user operations being associated with performing a task related to a process of installation and configuration of a cloud service for the first device, and the one or more API operations being called to complete the task;
storing the recorded data in a database;
receiving a user action associated with performing the task on the cloud management platform to automate the process of installation and configuration of the cloud service for a second device;
determining whether at least one parameter of the one or more parameters needs to be adjusted;
receiving a user input to adjust the at least one parameter if the at least one parameter needs to be adjusted for the second device; and
executing one of the recorded data or the recorded data with the at least one adjusted parameter to automate one or more other tasks by allowing a replay of the one or more user operations on the cloud management platform to complete the process of installation and configuration of the cloud service for the second device.

9. The system of claim 8, wherein the actions further comprises:
exporting, from the database, data corresponding to the one or more user operations; and
storing the exported data corresponding to the one or more user operations in at least one data format,
wherein the at least one data format includes at least one of Java, Python, script, source code, or object oriented system (OOS) module.

10. The system of claim 9, wherein the actions further comprises:
compiling, in an environment, the data corresponding to the one or more user operations to perform at least a second task.

11. The system of claim 8, wherein the task is associated with operating at least one cloud resource provided through the cloud management platform.

12. The system of claim 11, wherein the task includes at least one of: creating, browsing, editing, or deleting at least one cloud resource on the cloud management platform.

13. The system of claim 8, wherein the actions further comprises:
exporting, from the database, data corresponding to the one or more user operations as at least one orchestration template executable on an object orientated system (OOS).

14. The system of claim 8, wherein the actions further comprises:
storing data associated with the one or more user operations in at least a relational database.

15. A computer-readable storage medium storing computer-readable instructions executable by one or more processors of a video compression system, that when executed by the one or more processors, cause the one or more processors to perform actions comprising:
recording data associated with one or more user operations, one or more application programming interface (API) operations, and one or more parameters related to the one or more API operations on a cloud management platform and corresponding to a first device, the one or more user operations being associated with performing a task related to a process of installation and configuration of a cloud service for the first device, and the one or more API operations being called to complete the task;
storing the recorded data in a database; and
receiving a user action associated with performing the task on the cloud management platform to automate the process of installation and configuration of the cloud service for a second device;
determining whether at least one parameter of the one or more parameters needs to be adjusted for the second device;
receiving a user input to adjust the at least one parameter if the at least one parameter needs to be adjusted; and
executing one of the recorded data or the recorded data with the at least one adjusted parameter to automate one or more other tasks by allowing a replay of the one or more user operations on the cloud management platform to complete the process of installation and configuration of the cloud service for the second device.

16. The computer-readable storage medium of claim 15, wherein the actions further comprises:
executing the one or more user operations on the cloud management platform, causing a computing device to call the one or more API operations.

17. The computer-readable storage medium of claim 15, wherein the actions further comprises:
exporting, from the database, data corresponding to the one or more user operations; and storing the exported data corresponding to the one or more user operations in at least one data format,
wherein the at least one data format includes at least one of Java, Python, script, source code, or object oriented system (OOS) module.

18. The computer-readable storage medium of claim 15, wherein the actions further comprises:
compiling, in an environment, data corresponding to the one or more user operations to perform at least a second task.

\* \* \* \* \*